March 31, 1964   G. KLAASEN   3,127,213
AUTOMOBILE ROOF MOUNTING
Filed Aug. 15, 1961
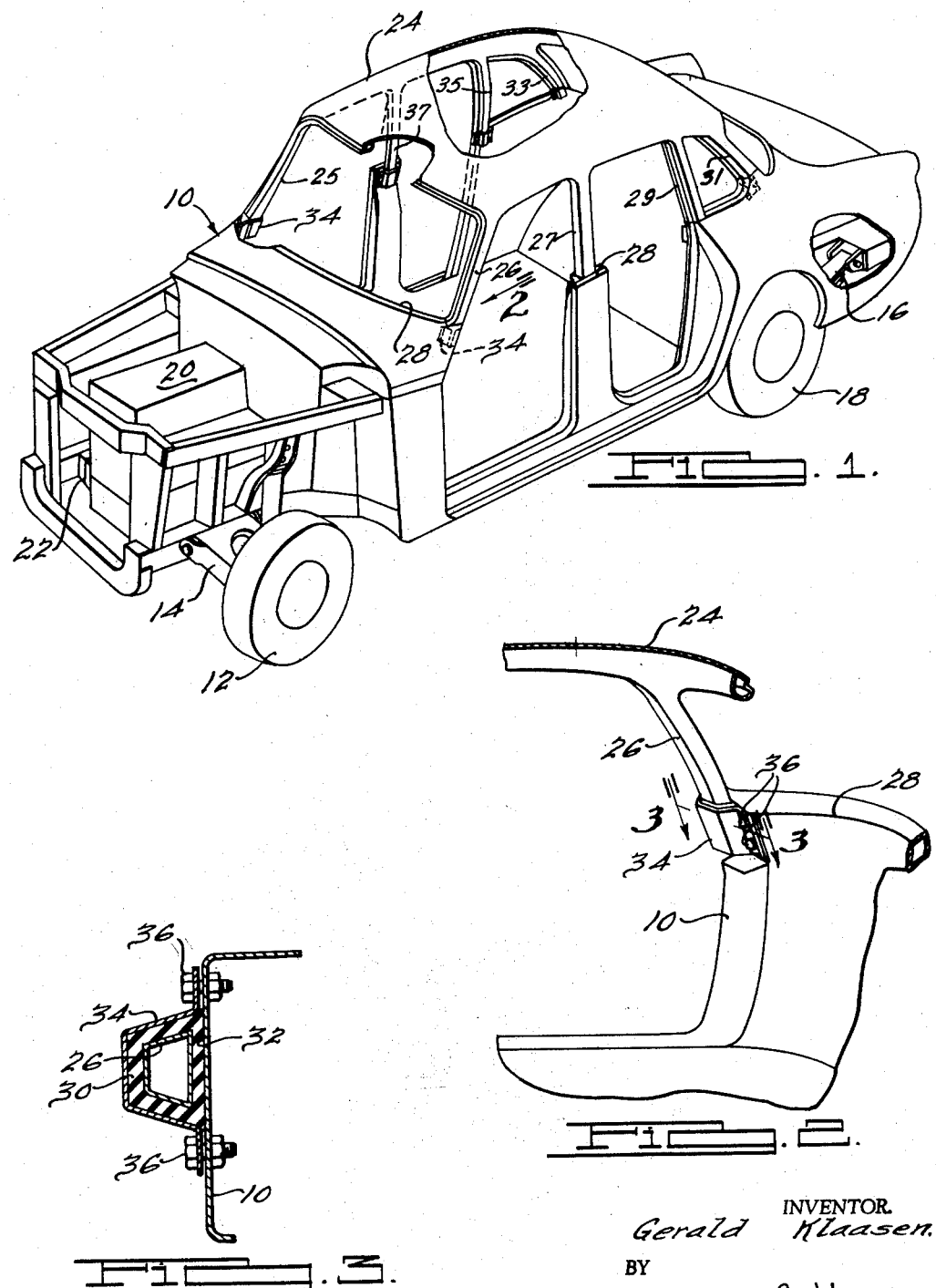
INVENTOR.
Gerald Klaasen.
BY
Harness and Harris
ATTORNEYS.

United States Patent Office 3,127,213
Patented Mar. 31, 1964

3,127,213
AUTOMOBILE ROOF MOUNTING
Gerald Klaasen, Detroit, Mich., assignor to Chrysler Corporation, Highland Park, Mich., a corporation of Delaware
Filed Aug. 15, 1961, Ser. No. 131,626
4 Claims. (Cl. 296—28)

This invention relates to automobile body construction and more particularly to a means for isolating the roof structure of such a body from other structural portions thereof to control the dynamics of the automobile.

In the most common type of automobile construction a structural frame is used to support an engine and the wheel suspension apparatus. A body is then bolted to the frame and separated therefrom by rubber-like pads. In the past few years another type of automobile construction has been adopted by an increasing number of manufacturers in which a body is not bolted to a frame as described above. In this construction, frequently referred to by the term "unitized" construction a single unitary construction includes a framework for a body incorporating members of sufficient strength to support the engine and the suspension from this single framework. There are certain advantages offered by such a construction over the separate frame and body construction, but there is at least one difficulty which will be discussed herein and it is an object of my invention to provide means for minimizing this difficulty.

The harshness of the ride and to some extent the sound characteristics of an automobile are a function of several factors including the bending natural frequencies of the body and frame assembly of the conventional automobile or of the unitary structure of the "unitized" type of automobile and the relationship of these bending natural frequencies, wheel hop frequency and the frequency of engine movement induced by road irregularities. The bending natural frequencies of the complete structure must be kept within certain limits to provide a satisfactory ride without excessive harshness. It is recognized that the bending natural frequencies of the complete automobile should be tuned away from the wheel hop frequency so that they are not aggregative and it is generally preferred that such bending frequencies be higher than the wheel hop frequency. Experience tells us that if the bending frequency of the complete automobile is too low when the vehicle will not stand jacking for a tire change or the like without distortion. On the other hand, if the bending frequency is too high certain benefits derived from relating this frequency to the frequency of engine movement induced by road irregularities are lost. The engine is a large mass generally mounted on soft mountings and it is the frequency of movement of this mass to which reference is made by mention of the frequency of engine movement. If the car is properly designed the frequency of bouncing of the engine may be used to dampen frequencies experienced by the automobile structure. It was mentioned above that the frequency of the automobile structure should not be too low or the automobile will be so flexible that it cannot stand distortion induced by jacking or the like and on the other hand if the frequency of the complete structure is too high one cannot tune it with the engine movements unless stiffer engine mountings are used and these, in turn, are undesirable because various vibrations and gear noises from the engine will then be transmitted to the frame or body structure.

It will be evident that when an automobile is designed it is almost impossible to anticipate the particular frequencies that will be encountered in connection with the suspension system, the engine mounting system and the structural framework of the vehicle. In the regular course of business by the time the first actual automobiles are assembled production in great volume is already committed and it is too late to change the major structural features of the automobile. Thus a disappointment in the relationship of the above discussed frequencies in a particular automobile model is of serious consequence. With the old construction in which a body was supported on a frame it was possible to modify the natural bending frequency of the complete automobile by such simple expedients as increasing the torque on the bolts that hold the body to the frame or substituting rubber cushions of other hardness or size. However, with the unitized construction now favored by some manufacturers there is no readily available variation that can be made in the natural bending frequency of the automobile. Thus, it would be with great disappointment that a manufacturer might find that when he built his first few automobiles of a new model that they did not have the desirable characteristics and frequencies which were intended and there is no last minute change available to him to improve the situation. Obvious changes in the metal framework theoretically would improve it, but considerations of time, die cost and the like render this alternative unavailable to the manufacturer.

It is a principal object of my invention to provide an improved automobile body construction which is particularly adapted for use in the "unitized" type of automobile although not necessarily so restricted. I have found that the roof structure and its depending supporting pillars need not be integrally formed with the basic framework of the vehicle body which supports the engine and the suspension. I prefer to bolt the depending roof supporting pillars to the unitized body construction and to cushion one from the other. This offers a means for isolating the structure of the car above the belt line from the remainder of the car structure by means of resilient material.

My improved construction reduces the bending natural frequencies of the complete automobile structure which in turn permits the use of softer engine mountings without inducing excessive shake.

It is also an object of my invention to silence the top of the automobile to reduce the transmission of road noise to vehicle occupants through a metallic roof.

It is also an object of my invention to provide means for tuning the natural bending frequencies of an automobile. In automobiles equipped with my invention when it is discovered that the automobile does not have the optimum frequency characteristics adjustments may be made by varying the cushioning between the roof panels and the main body structure both as to cushion size, type of rubber and degree of compression thereof.

In the description herein the term "belt line" will be used on occasion. This is a term generally referring to the upper edge of sheet metal panels in the body structure which define the lower edge of window openings.

In the drawings:

FIG. 1 is a perspective view, partly broken away, of an automobile incorporating my invention;

FIG. 2 is a perspective view of a portion of the automobile taken in the direction of the arrow 2 in FIG. 1; and FIG. 3 is a horizontal section taken on the line 3—3 of FIG. 2.

The automobile illustrated in FIG. 1 includes a lower body structure 10 which is preferably of unitized construction such that a welded assembly forms a framework and provides a support for suspension components for a front wheel 12. The suspension components are partially shown and designated by the numeral 14. It is to be understood that the other front wheel is similarly suspended. Framework of the body structure 10 also supports a conventional rear spring 16 which in turn supports an axle carrying a rear wheel 18 in conventional manner. It is again to be understood that the rear wheel on the other side of the vehicle is similarly supported.

An internal combustion engine 20 is mounted in the body structure in conventional manner and supported by resilient mounts 22 of conventional construction.

The automobile includes a roof structure 24 which in the particular four door sedan model illustrated has eight depending pillars 25, 26, 27, 29, 31, 33, 35 and 37. In conventional vehicles the pillars would generally be formed as integral extensions of the lower body structure 10 and it is to be understood that in different body styles the number of such pillars might vary. The individual pillars illustrated differ from each other in style and shape, but the general construction insofar as my invention is concerned is identical.

My invention relates to the fact that these pillars are not integrally connected to the lower body structure and it relates to the provision of means for fastening the pillars to the lower body structure 10 by means of mountings preferably located below the belt line 28 of the vehicle and incorporating rubber-like material.

Although FIGS. 2 and 3 show a single pillar mounted on the body structure and the associated mounting apparatus this showing is representative of the mounting used in each of the illustrated eight pillars and for purposes of description the showing of one is believed to be sufficient.

The pillar 26 in FIGURE 2 is of sufficient length so that it depends below the belt line 28 of the vehicle and the depending portion below the belt line is mounted on the body structure as illustrated in FIGS. 2 and 3.

A structural portion of the pillar 26 is surrounded by rubber-like material 30 which in turn is received within an aperture 32 formed by cooperating portions of a bracket 34 and a portion of the body structure 10. Suitable bolts 36 are used to secure the bracket 34 to the associated body structure 10 and the application of torque to bolts 36 places the rubber-like material 30 in compression between bracket 34 and the extension of pillar 26.

I prefer to form the extension of pillar 26 in a trapezoidal form as illustrated in FIG. 3 and to similarly shape bracket 34 so that compression of the rubber induced by the tightening of bolts 36 will effect compression of the rubber-like material on the sides of the extension of pillar 26 as well as on its forward and rearward faces.

This construction isolates the roof from the rest of the body so that it no longer serves as a metallic speaker for the emission of sounds and vibrations and it further alters the natural bending frequency of the automobile body structure by isolation of the roof structure from the rest of the body structure. It also provides a ready means for varying the bending frequencies of the vehicle body structure in that bolts 36 may, within limits, have more or less torque applied to them and the rubber-like material may be varied insofar as hardness or size is concerned if undesirable frequencies are found to exist in any given automobile.

I claim:

1. In a motor vehicle having a roof provided with depending supporting pillars and a lower body structure, a plurality of fastening means carried by said lower body structure and respectively gripping each of said pillars in load carrying relationship, each of said fastening means including a resilient separator interposed between one of said pillars and said lower body structure and forming the sole contact between such pillar and said lower body structure.

2. A motor vehicle comprising a first unitary metallic body structure including engine supporting members, suspension supporting members and a structural framework defining a floor and walls of a passenger compartment, a second unitary metallic structure including a roof and depending roof supporting structural members, and mechanism for securing said first unitary body structure and said second unitary structure together, said mechanism comprising rubber-like elements interposed between all adjacent metallic portions of said first and second metallic structures to completely isolate the metal parts of said first and second structures from each other and provide that the sole path for vibrations from said first structure to each of said roof supporting members is through a rubber-like element.

3. A motor vehicle comprising a first unitary stiff body structure including engine supporting members, suspension supporting members and a structural framework defining a floor and walls of a passenger compartment, a second unitary stiff structure including a roof and depending roof supporting structural members, a mechanism for securing each of said depending structural members to said first unitary body structure, each of said mechanisms including mechanical apparatus carried by one of said stiff structures and having no direct physical contact with the other of said stiff structures and vibration damping material compressed between said mechanical apparatus and the above mentioned other stiff structure to effect the sole load transmitting connection therebetween.

4. A motor vehicle comprising a first unitary stiff body structure including engine supporting members, suspension supporting members and a structural framework defining a floor and walls of a passenger compartment, a second unitary stiff structure including a roof and depending roof supporting structural members, mechanism for securing said first unitary body structure and said second unitary structure together, said mechanism including resilient material interposed between all adjacent portions of said roof supporting structural members and said first unitary body structure and the above mentioned resilient material constituting the sole physical connection between said first and second structures and serving to dampen the transmission of vibrations therebetween, and mechanical means compressing said resilient material between said adjacent portions to create load carrying connection.

References Cited in the file of this patent

UNITED STATES PATENTS

| 1,943,588 | Dinstbir | Jan. 16, 1934 |
| 3,015,519 | Barenyi | Jan. 2, 1962 |
| 3,036,670 | Jewell | May 29, 1962 |

FOREIGN PATENTS

| 73,653 | France | Sept. 5, 1960 |
| | (1st addition to No. 1,205,984) | |